3,517,003
Patented June 23, 1970

3,517,003
THIOL-SUBSTITUTED s-TRIAZINES
Reginald T. Wragg, Tamworth, England, assignor to The Dunlop Company Limited, London, England, a British company
No Drawing. Filed Oct. 9, 1967, Ser. No. 673,968
Claims priority, application Great Britain, Oct. 27, 1966, 48,158/66
Int. Cl. C07d 55/22
U.S. Cl. 260—249.6                                7 Claims

ABSTRACT OF THE DISCLOSURE

An s-triazine of the general formula

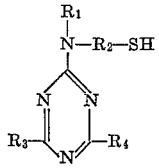

I where $R_1$ is hydrogen or an alkyl, alkene or aromatic radical, which may be substituted, $R_2$ is alkylene, alkenylene, dipropylene thioether, or a poly(propylene sulphide) group, $R_3$ and $R_4$ may be the same or different and are selected from $-N(R_1)-R_2-SH$ or a reactive substituent such as $OR_1$, SH, Cl, $NH.NH_2$, $NH_2$ or $NH.R_1$. Preferably the s-triazine has the general formula

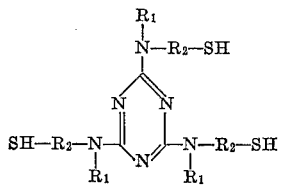

II of which the following is a specification.

These compounds are useful as cross-linking agents for difunctional thiol compounds and as polymer-modifying agents.

This invention relates to thiols and the preparation thereof and is particularly concerned with tri-functional thiols.

According to the present invention there is provided a thiol compound being an s-triazine of the general Formula I

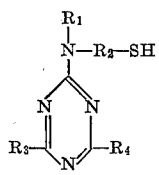

I where $R_1$ is hydrogen or an alkyl, alkenyl or aromatic radical, which may be substituted, $R_2$ is alkylene, alkenylene, dipropylene thioether or a poly(propylene sulphide) group having a molecular weight of about 486, $R_3$ and $R_4$ may be the same or different and are selected from $-N(R_1)-R_2-SH$ or reactive substituents such as $OR_1$, SH, Cl, $NH.NH_2$ and $NH.R_1$. The preferred form of the invention is concerned with trifunctional thiols in which $R_3$ and $R_4$ each represents a $-N(R_1)-R_2-SH$ group and are of the general formula

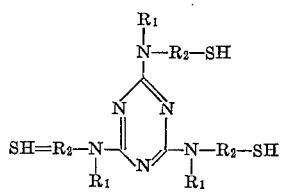

II

The preferred radicals represented by $R_2$ are lower alkylene, lower alkenylene, dipropylene thioether, or poly(propylene sulphide) groups having a molecular weight of about 486, while the preferred radicals representing $R_1$ are hydrogen or lower alkyl or lower alkenyl radicals. S-triazines where $R_1$ is hydrogen are trifunctional amino thiols, while s-triazines where $R_1$ is a substituent are mono-N-substituted trifunctional amino thiols.

The invention is also concerned with the method of preparing the preferred s-triazines where a cyanuric halide, preferably cyanuric chloride, is reacted with an amino thiol of formula $H-H(R_1)-R_2-SH$.

In the preferred form of the invention, when forming trifunctional thiols of s-thiazines all the halogen atoms in the cyanuric halide are replaced by the amine groupings. However, it is possible selectively to substitute the halogen atoms of the cyanuric halide with a wide variety of reagents to form the preferred s-triazines where $R_3$ and $R_4$ have the values indicated above for Formula I.

In preparing the compounds of the invention an amino thiol may be slowly added to a solution in an organic solvent of the cyanuric halide. An exothermic reaction occurs and after this has subsided the reaction mixture may be heated under reflux for several hours, for example from 2 to 6 hours. The hydrohalide salt formed may be converted to the free compound by conventional methods.

The simple amino thiols of s-triazines where $R_1$ is H or a lower alkyl radical and $R_2$ is a lower alkylene radical, may be used as cross-linking agents to cause gelation of difunctional thiols in compositions such as sealants. The trifunctional thiols where $R_1$ or $R_2$ contains ethylenic unsaturation may be further reacted to form directly a polymeric composition. The s-triazines where $R_3$ and $R_4$ are not amino thiol substituents may be used to modify compositions prepared from thiol tipped polysulphides or other polymers.

The invention is illustrated by the following examples in which all parts are parts by weight unless otherwise stated.

EXAMPLE I

This example illustrates the preparation of 2,4,6-tris (N-butyl-2-mercaptopropylamino)-s-triazine.

This example illustrates the preparation of a trifunctional cross-linking agent from the coupling reaction of cyanuric chloride and N-butyl-2-mercaptopropylamine.

To a solution of cyanuric chloride (18.5 gm.) in benzene (200 ml.) was added, dropwise, with stirring, N-butyl-2-mercaptopropylamine (80 gm.). A vigorous exothermic reaction occurred and amine hydrochloride was precipitated. The reaction mixture was heated to reflux for 2 hours, cooled and then filtered. The precipitate was washed with benzene and the combined filtrates evaporated in vacuo. The viscous residue was subjected to high vacuum distillation ($N_2$ bleed) under reduced pressure to afford an 86 percent yield of 2,4,6-tris(N-butyl-2-mercaptopropylamino) - s - triazine as a pale-yellow viscous oil, boiling point 192–194° C. 0.5 mm. Hg.

Infra-red spectra revealed the presence of a substituted bond at 3.93μ due to —SH and the complete absence of absorptions due to —NH. Argentimetric titration gave a value of 18.2 percent—SH groups. (Calc. 19 percent).

5 gm. of a low molecular weight difunctional polysulphide and an equal weight of the 2,4,6-tris(N-butyl-2-mercaptopropylamino)-s-triazine were mixed with 5 gm. of a lead peroxide dispersion in an inert plasticizer (HB 40, ex Monsanto Chemical Company) containing twice the stoichiometric amount of peroxide required to oxidatively couple the thiol groups. A mildly exothermic reaction took place and the mixture set tack-free after 30 minutes. After 24 hours a tough insoluble product was formed. In contrast a mixture of the difunctional polysulphide (5 gm.) and lead peroxide alone in the same stoichiometric proportions was still soft, plastic and soluble after 24 hours.

EXAMPLE II

This example illustrates the preparation of a trifunctional polymer which can be cured to a gelled product directly.

To a solution of cyanuric chloride (37 gm.) in benzene (1200 ml.) was added, with stirring, an alpha-amino-omega thiol poly(propylene sulphide) (M wt. 545) (754 gm., 6 equivs). An exothermic reaction occurred. The mixture was then heated to reflux, under $N_2$, for 4 hours. A further 37 gm. of cyanuric chloride was added and the refluxing continued for 4 hours longer. After this time, 6 equivalents of triethylamine (enough to remove the HCl formed) was added and refluxing continued for 6 hours. The mixture was then cooled and filtered from amine hydrochloride. The solvent was removed under reduced pressure to leave a viscous yellow polymer with very little odour.

Argentimetric titration revealed the presence of 8.3 pecent —SH groups. The molecular weight was determined ebullioscopically and found to be 1135. This is equivalent to 2.8 —SH groups per molecule.

5 gm. of this trifunctional thiol was mixed with 1.9 gm. of a 75 percent lead peroxide dispersion in an inert plasticizer (HB 40, ex Monsanto Chemical Company) giving a mixture containing twice the stoichiometric amount of lead peroxide to oxidatively couple mercapto groups. A highly exothermic reaction took place and the mixture set to an insoluble tack-free gel within 1 hour, and to a tough plastic of low extensibility after 1 day.

EXAMPLE III

This example illustrates the preparation of 2,4,6-tris (N - butyl - 2(2' - mercaptopropylthio)propylamino)-s-triazine.

To a solution of cyanuric chloride (18.5 gm.) in benzene (250 ml.) was added, dropwise, with stirring, N-butyl - 2(2' - mercaptopropylthio)propylamine (132.6 gm.) (obtained by reacting n-butylamine with 2 equivalents of propylene sulphide). After the addition was complete, the mixture was heated to reflux for 8 hours. After cooling, dry triethylamine (31.0 gm.) was added. After stirring for 1 hour the precipitate was filtered off and washed with ether. A sample of this precipitate was identified as triethylamine hydrochloride by comparison of its infra-red spectrum with that of an authentic sample.

The solvent was removed from the filtrate and the residue subjected to vacuum distillation ($N_2$ bleed). A total of 57.0 gm. (ca. 87 percent of the excess added) of starting amino thiol was recovered, boiling point 96–100° C./0.1 mm. Hg. The residue was the highly viscous title compound which could not be distilled under the above conditions.

The title compound was exothermically cross-linked by lead peroxide to a tough, insoluble polymer of low extensibility. The —SH content, determined argentimetrically, was 12.5 percent. (Calc. ca. 13.0 percent).

Having now described my invention, what I claim is:
1. A thiol compound which is an s-triazine of the formula

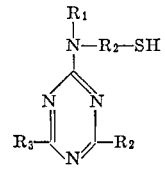

where $R_1$ is a lower alkyl radical; $R_2$ is selected from the group consisting of lower alkylene groups, dipropylene thioether groups and poly(propylene sulphide) groups having a molecular weight of about 486; and $R_3$ and $R_4$ may be the same or different and are selected from the group consisting of —N($R_1$)—$R_2$—SH, —NH.$NH_2$, —$NHR_1$, —SH, —$OR_1$ and —Cl.

2. A thiol compound as defined in claim 1, wherein $R_2$ is propylene.

3. A thiol compound as defined in claim 1, wherein $R_1$ is butyl.

4. 2,4,6-tris-[alpha-amino-omega - thiol-poly(propylene sulphide)]-s-triazine, the poly(propylene sulphide) moiety having a molecular weight of about 486.

5. A compound as claimed in claim 1 of the formula

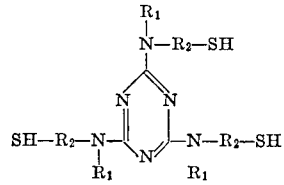

wherein $R_1$ and $R_2$ are defined as in claim 1.

6. 2,4,6 - tris(N - butyl - 2 - mercaptopropylamino)-s-triazine.

7. 2,4,6-tris(N - butyl-2(2' - mercaptopropylthio)propylamino)-s-triazine.

References Cited

UNITED STATES PATENTS

| 2,393,755 | 1/1946 | D'Alelio | 260—249.8 XR |
| 3,141,885 | 7/1964 | Ross et al. | 260—249.8 |
| 3,235,359 | 2/1966 | Acker | 260—249.8 XR |

HENRY R. JILES, Primary Examiner

J. M. FORD, Assistant Examiner

U.S. Cl. X.R.

260—79.7, 249.5, 249.8